(12) United States Patent
Essiambre et al.

(10) Patent No.: US 10,333,621 B2
(45) Date of Patent: Jun. 25, 2019

(54) OPTICAL COMMUNICATION WITH SOME COMPENSATION OF NONLINEAR OPTICAL EFFECTS

(71) Applicant: Alcatel-Lucent USA Inc., Murray Hill, NJ (US)

(72) Inventors: René-Jean Essiambre, Red Bank, NJ (US); Chongjin Xie, Morganville, NJ (US)

(73) Assignee: NOKIA OF AMERICA CORPORATION, Murray Hill, NJ (US)

( * ) Notice: Subject to any disclaimer, the term of this patent is extended or adjusted under 35 U.S.C. 154(b) by 0 days.

(21) Appl. No.: 15/434,687

(22) Filed: Feb. 16, 2017

(65) Prior Publication Data

US 2017/0237498 A1 Aug. 17, 2017

Related U.S. Application Data

(60) Provisional application No. 62/295,770, filed on Feb. 16, 2016.

(51) Int. Cl.
*H04B 10/40* (2013.01)
*H04B 10/58* (2013.01)
(Continued)

(52) U.S. Cl.
CPC ....... *H04B 10/2543* (2013.01); *H04B 10/614* (2013.01); *H04B 10/6163* (2013.01)

(58) Field of Classification Search
CPC ....... H04B 10/40; H04B 10/58; H04B 10/697
See application file for complete search history.

(56) References Cited

U.S. PATENT DOCUMENTS 6,683,855 B1 1/2004 Bordogna et al.
7,212,741 B2 5/2007 Myong et al.
(Continued)

OTHER PUBLICATIONS

C. Paré, et al., "Compensating for dispersion and the nonlinear Kerr effect without phase conjugation," Optical Society of America, 1996, Optics Letters, vol. 21, No. 7, pp. 459-461.
(Continued)

*Primary Examiner* — Mina M Shalaby
(74) *Attorney, Agent, or Firm* — Mendelsohn Dunleavy, P.C.; Yuri Gruzdkov

(57) ABSTRACT

We disclose an optical transport system configured to reduce nonlinear signal distortions using an electronic phase rotation, the phase value of which is determined using pre-filtering, e.g., via a low-pass filter, of the digital samples representing an optical communication signal prior to applying a squaring operation to the digital samples. In some embodiments, the phase value used in the electronic phase rotation can be determined using double filtering of the digital samples that, in addition to the pre-filtering, employs post-filtering, e.g., via another low-pass filter, of the digital samples generated by the squaring operation. The electronic phase rotation can be implemented as part of a backward-propagation algorithm that, in addition to reducing the nonlinear signal distortions, provides at least partial dispersion compensation. In various embodiments, the corresponding backward-propagation module can be incorporated into the transmitter's digital signal processor (DSP) or the receiver's DSP.

19 Claims, 4 Drawing Sheets

(51) Int. Cl.
  *H04B 10/69* (2013.01)
  *H04B 10/2543* (2013.01)
  *H04B 10/61* (2013.01)

(56) References Cited

U.S. PATENT DOCUMENTS

| | | | |
|---|---|---|---|
| 7,424,651 B2 | 9/2008 | Domagala et al. | |
| 7,574,146 B2 | 8/2009 | Chiang et al. | |
| 7,734,191 B1 | 6/2010 | Welch et al. | |
| 7,747,177 B2 | 6/2010 | Chen et al. | |
| 8,036,541 B2 | 10/2011 | Toyoshima et al. | |
| 8,073,345 B2 | 12/2011 | Chen et al. | |
| 8,805,209 B2 | 8/2014 | Li et al. | |
| 8,861,981 B2* | 10/2014 | Liu | H04B 10/6161 398/147 |
| 9,020,364 B2 | 4/2015 | Xie et al. | |
| 9,112,614 B2 | 8/2015 | Randel et al. | |
| 9,225,455 B2 | 12/2015 | Yu et al. | |
| 9,337,934 B1* | 5/2016 | Agazzi | H04B 10/61 |
| 2010/0266291 A1* | 10/2010 | Boffi | H04B 10/61 398/159 |
| 2012/0263481 A1* | 10/2012 | Ip | H04B 10/2543 398/193 |
| 2012/0290244 A1* | 11/2012 | Yan | H04B 10/255 702/86 |
| 2013/0156443 A1* | 6/2013 | Lowery | H04B 10/6971 398/141 |
| 2013/0230313 A1* | 9/2013 | Yan | H04B 10/6971 398/25 |
| 2014/0099128 A1* | 4/2014 | Mateo | H04B 10/6163 398/158 |
| 2015/0288458 A1* | 10/2015 | Honda | H04J 14/02 398/81 |
| 2015/0372764 A1 | 12/2015 | Kaneda | |
| 2015/0372765 A1* | 12/2015 | Yasuda | H04B 10/613 398/29 |
| 2016/0036554 A1* | 2/2016 | Yasuda | H04B 10/6161 398/65 |
| 2016/0050025 A1* | 2/2016 | Yasuda | H04B 10/6161 398/65 |

OTHER PUBLICATIONS

Essiambre, René-Jean, et al., "Fibre nonlinearities in electronically pre-distorted transmission," 31st European Conference on Optical Communication, ECOC 2005 proceedings vol. 2, pp. 191-192.
Roberts, Kim, et al., "Electronic Precompensation of Optical Nonlinearity," IEEE Photonics Technology Letters, 2006, vol. 18, No. 2, pp. 403-405.
Ip, Ezra, et al., "Compensation of Dispersion and Nonlinear Impairments Using Digital Backpropagation," Journal of Lightwave Technology, 2008, vol. 26, No. 20, pp. 3416-3425.
Rafique, Danish, et al., "Various Nonlinearity Mitigation Techniques Employing Optical and Electronic Approaches," IEEE Photonics Technology Letters, 2011, vol. 23, No. 23, pp. 1838-1840.
Forzati, Marco, et al., "Digital Non-Linear Compensation for High-Speed Long-Haul Transmission," 13th International Conference on Transparent Optical Networks (ICTON), 2011 (4 pages).
Koike-Akino, Toshiaki, et al., "Fractionally-Spaced Statistical Equalizer for Fiber Nonlinearity Mitigation in Digital Coherent Optical Systems," Optical Fiber Communication Conference and Exposition (OFC/NFOEC), 2012 and the National Fiber Optic Engineers Conference (5 pages).
Stojanovic, Nebojsa, et al., "Hybrid Compensation of Nonlinear Effects in Coherent, Optical Receivers," Optical Fiber Communication Conference and Exposition (OFC/NFOEC), 2012 and the National Fiber Optic Engineers Conference (3 pages).
Irukulapati, Naga V., et al., "Extending Digital Backpropagation to Account for Noise," 39th European Conference and Exhibition on Optical Communication (ECOC), 2013 (3 pages).
Essiambre, René-Jean, et al., "Capacity Limits of Optical Fiber Networks," Journal of Lightwave Technology, 2010, vol. 28, No. 4, pp. 662-701.
Sinkin, Oleg V., et al., "Optimization of the Split-Step Fourier Method in Modeling Optical-Fiber Communications Systems," Journal of Lightwave Technology, vol. 21, No. 1, 2003, pp. 61-68.
Oda, Shoichiro, et al., "112 Gb/s DP-QPSK Transmission Using a Novel Nonlinear Compensator in Digital Coherent Receiver," Conference on Optical Fiber Communication OFC, 2009 (3 pages).
Liu, L., et al., "Baud-Rate Back-propagation for Intra-channel Nonlinear Impairments Compensation," Optical Fiber Communication Conference and Exposition (OFC/NFOEC), 2012 and the National Fiber Optic Engineers Conference, OFC/NFOEC Technical Digest (3 pages).
Xie, Chongjin, et al., "Electronic Nonlinearity Compensation in 112-Gb/s PDM-QPSK Optical Coherent Transmission Systems," 36th European Conference and Exhibition on Optical Communication (ECOC), 2010, (3 pages).
Du, Liang B., et al., "Improved single channel backpropagation for intra-channel fiber nonlinearity compensation in long-haul optical communication systems," Optics Express, 2010, vol. 18, No. 16, pp. 17075-17088.
Li, Lei, et al., "Implementation Efficient Nonlinear Equalizer Based on Correlated Digital Backpropagation," Optical Fiber Communication Conference and Exposition (OFC/OFOEC), 2011 and the National Fiber Optic Engineers Conference, (4 pages).
Yan, Weizhen, et al., "Low Complexity Digital Perturbation Back-propagation," 37th European Conference and Exhibition on Optical Communication (ECOC), ECOC Technical Digest, 2011, (3 pages).
Rafique, Danish, et al., "Compensation of intra-channel nonlinear fibre impairments using simplified digital back-propagation algorithm," Optics Express, 2011, vol. 19, No. 10, pp. 9453-9460.
Xie, Chongjin, "WDM coherent PDM-QPSK systems with and without inline optical dispersion compensation," Optics Express, 2009, vol. 17, No. 6, pp. 4815-4823.
Savory, Seb J., et al., "Digital Coherent Optical Receivers: Algorithms and Subsystems," IEEE Journal of Selected Topics in Quantum Electronics, 2010, vol. 16, No. 5, pp. 1164-1179.
"Advanced optical modulation formats," www.researchgate.net, 2008 [retrieved on Jan. 24, 2017] Retrieved from the Internet: <URL: https://www.researchgate.net/profile/Rene-Jean_Essiambre/publication/2998024_Advanced_Optical_Modulation_Formats/links/546e18050cf2b5fc17603e0e.pdf> pp. 23-91.
Godard, Dominique N., "Self-Recovering Equalization and Carrier Tracking in Two-Dimensional Data Communication Systems," IEEE Transactions on Communications, 1980, vol. Com-28, No. 11, pp. 1867-1875.
Viterbi, Andrew J., et al., "Nonlinear Estimation of PSK-Modulated Carrier Phase with Application to Burst Digital Transmission," IEEE Transactions on Information Theory, 1983, vol. IT-29, No. 4, pp. 543-551.
Poggiolini, P., et al., "Evaluation of the computational effort for chromatic dispersion compensation in coherent optical PM-OFDM and PM-QAM systems," Optics Express, 2009, vol. 17, No. 3, pp. 1385-1403.
Duhamel, P., et al., "'Split Radix' FFT Algorithm," Electronics Letters, 1984, vol. 20 No. 1, pp. 14-16.
Gao, Ying, et al., "Method for Determining the Low-Pass Filter Bandwidth for the Low-Pass Filter Assisted Digital Back Propagation Algorithm," 39th European Conference and Exhibition on Optical Communication (ECOC), 2013, (3 pages).
Rafique, Danish, et al., "Digital back-propagation for spectrally efficient WDM 112 Gbit/s PM m-ary QAM transmission," Optics Express, 2011, vol. 19, Issue 6, pp. 5219-5224.
"Backpropagation without Multiplication," http://papers.nips.cc/ 1993 [retrieved on Jan. 23, 2017] Retrieved from the Internet: <URL: https://papers.nips.cc/paper/833-backpropagation-without-multiplication.pdf> pp. 232-239.
Zhu, Likai, et al., "Folded digital backward propagation for dispersion-managed fiber-optic transmission," Optics Express (2011) vol. 19, No. 7, pp. 5953-5959.

(56) References Cited

OTHER PUBLICATIONS

"Digital Backward Propagation: A Technique to Compensate Fiber Dispersion and Non-Linear Impairments," https://opus4.kobv.de/, 2011 [retrieved on Jan. 23, 2017] Retrieved from the Internet: <URL: https://opus4.kobv.de/opus4-fau/files/2141/Asif_Lin_Schmauss_Digital.pdf, pp. 25-50.

Secondini, M., et al., "Coherent 100G Nonlinear Compensation with Single-Step Digital Backpropagation," Proceedings of the Optical Networks Design and Modelling (ONDM) Conference, 2015, (5 pages).

Zhang, Fangyuan, et al., "Advanced and Low-Complexity Digital Backpropagation for Subcarrier-Multiplexing Systems," Optical Fiber Communications Conference and Exhibition (OFC), 2015, (3 pages).

De Jesús, Orlando, et al., "Backpropagation Algorithms for a Broad Class of Dynamic Networks," IEEE Transactions on Neural Networks, 2007, vol. 18, No. 1, pp. 14-27.

Liga, Gabriele, et al., "Digital Back-Propagation for High Spectral-Efficiency Terabits Superchannels," Optical Fiber Communications Conference and Exhibition (OFC), 2014, (3 pages).

Md. Saifuddin Faruk, "Digital Signal Processing for Coherent Transceivers Employing Multilevel Formats," Journal of Lightwave Technology, 2017, vol. 35, No. 5 (18 pages).

C. Par'e, A. Villeneuve, and S. LaRochelle, "Split compensation of dispersion and self-phase modulation in optical communication systems," Optics Communications, vol. 160, No. 13, pp. 130-138, 1999.

\* cited by examiner

220

220

220

ОPTICAL COMMUNICATION WITH SOME COMPENSATION OF NONLINEAR OPTICAL EFFECTS

CROSS-REFERENCE TO RELATED APPLICATIONS

This application claims priority from U.S. Provisional Patent Application No. 62/295,770 filed on 16 Feb. 2016 and entitled "OPTICAL COMMUNICATION WITH SOME COMPENSATION OF NONLINEAR OPTICAL EFFECTS," which is incorporated herein by reference in its entirety.

BACKGROUND

Field

The present disclosure relates to optical communication equipment and, more specifically but not exclusively, to at least partial compensation of nonlinear optical effects.

Description of the Related Art

This section introduces aspects that may help facilitate a better understanding of the disclosure. Accordingly, the statements of this section are to be read in this light and are not to be understood as admissions about what is in the prior art or what is not in the prior art.

After propagating through a length of optical fiber, the received optical signal may be distorted due to linear impairments, such as chromatic dispersion (CD) and polarization mode dispersion (PMD), and nonlinear impairments, such as the Kerr effect, self-phase modulation (SPM), cross-phase modulation (XPM), and four-wave mixing (FWM). These distortions typically cause a detrimental increase in the bit-error rate (BER). Optical and electrical signal-processing techniques that can reduce this BER penalty are therefore desirable.

SUMMARY OF SOME SPECIFIC EMBODIMENTS

Disclosed herein are various embodiments of an optical transport system configured to reduce nonlinear signal distortions using an electronic phase rotation, the phase value of which is determined using pre-filtering, e.g., via a low-pass filter, of the digital samples representing an optical communication signal prior to applying a squaring operation to the digital samples. In some embodiments, the phase value used in the electronic phase rotation can be determined using double filtering of the digital samples that, in addition to the pre-filtering, employs post-filtering, e.g., via another low-pass filter, of the digital samples generated by the squaring operation. The electronic phase rotation can be implemented as part of a backward-propagation algorithm that, in addition to reducing the nonlinear signal distortions, provides at least partial dispersion compensation. In various embodiments, the corresponding backward-propagation module can be incorporated into the transmitter's digital signal processor (DSP) or the receiver's DSP.

According to one embodiment, provided is an apparatus comprising: an optical front-end circuit configured to transmit or receive an optical communication signal; and a signal processor operatively connected to the optical front-end circuit and configured to: apply an electronic phase rotation to digital samples representing the optical communication signal; and determine a phase value for the electronic phase rotation using pre-filtering of the digital samples performed by a low-pass filter prior to applying a squaring operation to the digital samples.

According to another embodiment, provided is an apparatus comprising: an optical front-end circuit configured to transmit or receive an optical communication signal; and a first electronic nonlinear-compensation module operatively connected to the optical front-end circuit to process digital samples corresponding to the optical communication signal; and wherein the first electronic nonlinear-compensation module comprises: a first digital filter configured to digitally filter a first sequence of the digital samples to generate a second sequence of the digital samples; and a first squaring circuit configured to generate a squared absolute value of each digital sample of the second sequence to generate a third sequence of the digital samples; and wherein the first electronic nonlinear-compensation module is configured to: apply a phase rotation to the first sequence of the digital samples; and determine a phase value used in the phase rotation using the third sequence of the digital samples.

BRIEF DESCRIPTION OF THE DRAWINGS

Other aspects, features, and benefits of various disclosed embodiments will become more fully apparent, by way of example, from the following detailed description and the accompanying drawings, in which.

DETAILED DESCRIPTION

Figure 1:
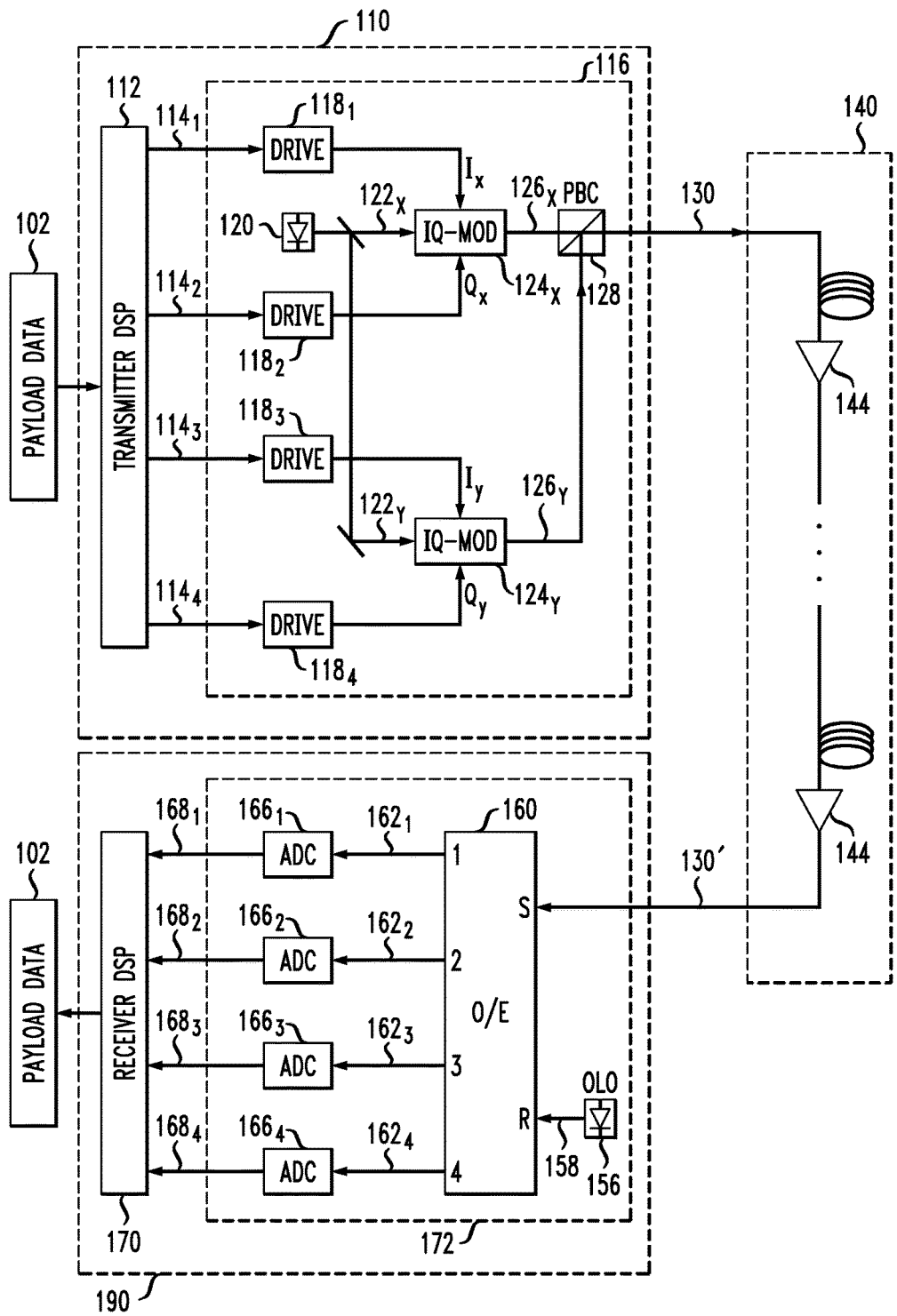
FIG. 1 shows a block diagram of an optical transport system according to an embodiment.

FIG. 1 shows a block diagram of an optical transport system 100 according to an embodiment. System 100 has an optical transmitter 110 and an optical receiver 190 coupled to one another via an optical transport link 140. In an example embodiment, optical transport link 140 can be implemented using one or more spans of optical fiber or fiber-optic cable. For illustration purposes and without any implied limitations, optical transport link 140 is shown in FIG. 1 as being an amplified optical link having a plurality of optical amplifiers 144 configured to amplify the optical signals that are being transported through the link, e.g., to counteract signal attenuation. In an alternative embodiment, optical transport link 140 that has only one or even no optical amplifiers 144 can similarly be used.

In operation, transmitter 110 receives a digital electrical input stream 102 of payload data and applies it to a digital signal processor (DSP) 112. DSP 112 processes input data stream 102 to generate digital signals $114_1$-$114_4$. In an example embodiment, DSP 112 may perform, inter alia, one or more of the following: (i) de-multiplex input stream 102 into two sub-streams, each intended for optical transmission using a respective one of the orthogonal (e.g., X and Y) polarizations of an optical output signal 130; (ii) encode each of the sub-streams using a suitable code, e.g., to prevent error propagation and enable error correction at receiver 190; (iii) convert each of the two resulting sub-streams into a corresponding sequence of constellation symbols; and (iv) perform digital signal pre-distortion, e.g., to mitigate the adverse effects imposed by an electrical-to-optical (E/O) converter (also sometimes referred to as a front-end circuit) 116 of transmitter 110, optical transport link 140, and/or a front-end circuit 172 of receiver 190. In each signaling interval (also referred to as a symbol period or time slot), signals $114_1$ and $114_2$ carry digital values that represent the in-phase (I) component and quadrature (Q) component, respectively, of a corresponding (possibly pre-distorted) constellation symbol intended for transmission using a first (e.g., X) polarization of light. Signals $114_3$ and $114_4$ similarly carry digital values that represent the I and Q components, respectively, of the corresponding (possibly pre-distorted) constellation symbol intended for transmission using a second (e.g., Y) polarization of light.

E/O converter 116 operates to transform digital signals $114_1$-$114_4$ into a corresponding modulated optical output signal 130. More specifically, drive circuits $118_1$ and $118_2$ transform digital signals $114_1$ and $114_2$, as known in the art, into electrical analog drive signals $I_X$ and $Q_X$, respectively. Drive signals $I_X$ and $Q_X$ are then used, in a conventional manner, to drive an I-Q modulator $124_X$. In response to drive signals $I_X$ and $Q_X$, I-Q modulator $124_X$ operates to modulate an X-polarized beam $122_X$ of light supplied by a laser source 120 as indicated in FIG. 1, thereby generating a modulated optical signal $126_X$.

Drive circuits $118_3$ and $118_4$ similarly transform digital signals $114_3$ and $114_4$ into electrical analog drive signals $I_Y$ and $Q_Y$, respectively. In response to drive signals $I_Y$ and $Q_Y$, an I-Q modulator $124_Y$ operates to modulate a Y-polarized beam $122_Y$ of light supplied by laser source 120 as indicated in FIG. 1, thereby generating a modulated optical signal $126_Y$. A polarization beam combiner 128 operates to combine modulated optical signals $126_X$ and $126_Y$, thereby generating optical output signal 130. Optical output signal 130 is then applied to optical transport link 140.

After propagating through optical transport link 140, optical signal 130 becomes optical signal 130', which is applied to receiver 190. Optical signal 130' may differ from optical signal 130 because optical transport link 140 typically adds noise and imposes various linear and nonlinear signal distortions, such as the above-mentioned Kerr effect, CD, PMD, SPM, XPM, and FWM.

Front-end circuit 172 of receiver 190 comprises an optical-to-electrical (O/E) converter 160, analog-to-digital converters (ADCs) $166_1$-$166_4$, and an optical local-oscillator (OLO) source 156. O/E converter 160 has (i) two input ports labeled S and R and (ii) four output ports labeled 1 through 4. Input port S receives optical signal 130' from optical transport link 140. Input port R receives an OLO signal 158 generated by OLO source 156. OLO signal 158 has an optical-carrier frequency (wavelength) that is sufficiently close to that of signal 130' to enable coherent (e.g., intradyne) detection of the latter signal. OLO signal 158 can be generated, e.g., using a relatively stable tunable laser whose output wavelength (frequency) is approximately the same as the carrier wavelength (frequency) of optical signal 130'.

In an example embodiment, O/E converter 160 operates to mix input signal 130' and OLO signal 158 to generate eight different mixed (e.g., by interference) optical signals (not explicitly shown in FIG. 1). O/E converter 160 then converts the eight mixed optical signals into four electrical signals $162_1$-$162_4$ that are indicative of complex values corresponding to the two orthogonal-polarization components of signal 130'. For example, electrical signals $162_1$ and $162_2$ may be an analog I signal and an analog Q signal, respectively, corresponding to a first (e.g., horizontal, h) polarization component of signal 130'. Electrical signals $162_3$ and $162_4$ may similarly be an analog I signal and an analog Q signal, respectively, corresponding to a second (e.g., vertical, v) polarization component of signal 130'. Note that the orientation of the h and v polarization axes at receiver 190 may not coincide with the orientation of the X and Y polarization axes at transmitter 110.

Each of electrical signals $162_1$-$162_4$ generated by O/E converter 160 is converted into digital form in a corresponding one of ADCs $166_1$-$166_4$. Optionally, each of electrical signals $162_1$-$162_4$ may be amplified in a corresponding electrical amplifier (not explicitly shown) prior to the resulting signal being converted into digital form. Digital signals $168_1$-$168_4$ produced by ADCs $166_1$-$166_4$ are then processed by a DSP 170 to recover the data of the original input data stream 102 applied to transmitter 110. In an example embodiment, DSP 170 may perform, inter alia, one or more of the following: (i) perform signal processing directed at dispersion compensation; (ii) perform signal processing directed at compensation of nonlinear distortions; (iii) perform electronic polarization de-multiplexing; and (iv) perform error correction based on the data encoding applied at DSP 112. Example embodiments of DSP 170 are described in more detail below in reference to FIGS. 2-5.

In some embodiments, the signal processing directed at dispersion compensation and/or compensation of nonlinear distortions can be performed at DSP 112 instead of being performed at DSP 170. In this case, this signal processing can be used to pre-distort optical output signal 130 in a manner that causes optical signal 130' to be less distorted than in the absence of this signal processing.

Figure 2:
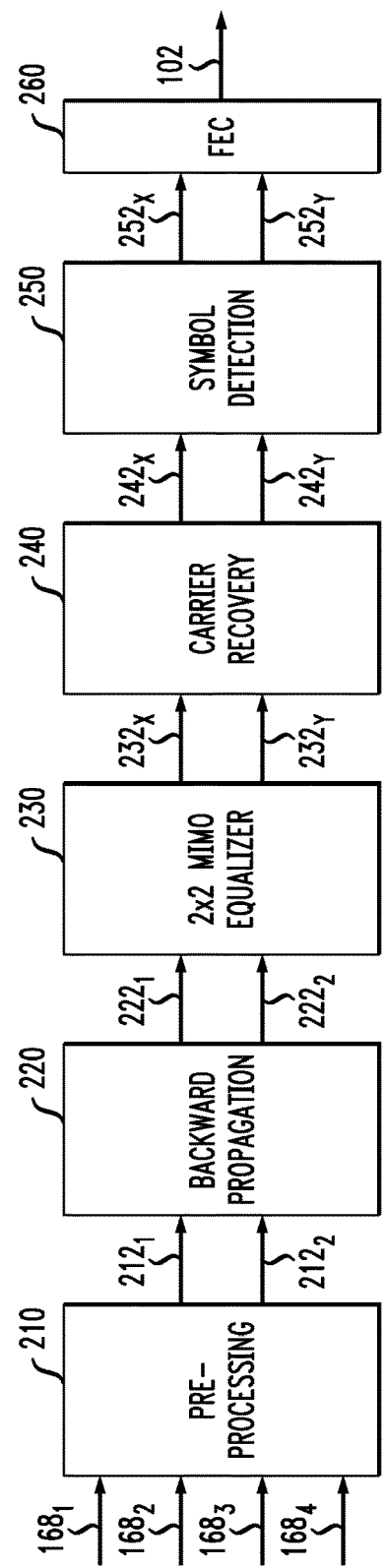
FIG. 2 shows a block diagram of a digital signal processor that can be used in the optical transport system of FIG. 1 according to an embodiment.

FIG. 2 shows a block diagram of DSP 170 (FIG. 1) according to an embodiment. Digital signals $168_1$-$168_4$ and output data stream 102 are also shown in FIG. 2 to better illustrate the relationship between the circuits shown in FIGS. 1 and 2.

Ideally, digital signals $168_1$ and $168_2$ represent the I and Q components, respectively, of the horizontal polarization component of optical signal 130', and digital signals $168_3$ and $168_4$ represent the I and Q components, respectively, of the vertical polarization component of that optical signal. However, various transmission impairments, front-end implementation imperfections, and configuration inaccuracies generally cause each of digital signals $168_1$-$168_4$ to be a convoluted signal that has various signal distortions and/or contributions from different signal components originally generated at transmitter 110 (FIG. 1). The train of signal processing implemented in DSP 170 is generally directed at reducing the adverse effects of signal distortions and de-convolving digital signals $168_1$-$168_4$ so that the transmitted data can be properly recovered to generate output data stream 102.

DSP 170 comprises a signal-pre-processing module 210 configured to receive digital signals $168_1$-$168_4$. One of the functions of module 210 may be to adapt the signal samples received via digital signals $168_1$-$168_4$ to a form that is more-suitable for the signal-processing algorithms implemented in the downstream modules of DSP 170. For example, module 210 may be configured to (i) resample digital signals $168_1$-$168_4$ such that each of these signals carries two samples per symbol period and (ii) convert the resulting signal samples into the corresponding complex-valued signal samples. The resulting complex-valued digital signals generated by signal-pre-processing module 210 are labeled $212_1$-$212_2$.

DSP 170 further comprises a backward-propagation (BP) module 210 that converts digital signals $212_1$ and $212_2$ into digital signals $222_1$ and $222_2$, respectively. In an example embodiment, BP module 210 implements signal processing directed at causing digital signals $222_1$ and $222_2$ to represent a good approximation of the undistorted optical signal 130 applied by transmitter 110 to optical transport link 140 (see FIG. 1). This signal processing can be based, e.g., on a numerical model that applies the negative sign to certain signal-propagation parameters, such as the dispersion coefficient D and the nonlinear coefficient γ, to mathematically invert the non-linear Schrödinger equation that describes the forward signal propagation through optical transport link 140. The resulting inverse non-linear Schrödinger equation can be solved, e.g., using the split-step Fourier method (SSFM), to generate digital signals $222_1$ and $222_2$.

Example embodiments of BP module 220 are described in more detail below in reference to FIGS. 3-5. The general principles of digital BP and SSFM, as applied to optical communications, are reviewed in a paper by Rameez Asif, Chien-Yu Lin, and Bernhard Schmauss, entitled "Digital Backward Propagation: A Technique to Compensate Fiber Dispersion and Non-Linear Impairments," published as Chapter 2 in the e-book "Applications of Digital Signal Processing," Dr. Christian Cuadrado-Laborde (Ed.), InTech, DOI: 10.5772/25410, which paper is incorporated herein by reference in its entirety. Certain embodiments of BP module 220 may benefit from the use of some aspects of the digital BP techniques disclosed, e.g., in U.S. Pat. Nos. 8,036,541, 8,805,209, and 9,225,455, all of which are incorporated herein by reference in their entirety.

Digital signals $222_1$ and $222_2$ are applied to a 2×2 MIMO (multiple-input/multiple-output) equalizer 230 for MIMO-equalization processing therein, and the resulting equalized signals are complex-valued digital signals $232_X$ and $232_Y$. In an example embodiment, equalizer 230 can be a butterfly equalizer configured to perform electronic polarization demultiplexing and reduce residual inter-symbol interference (ISI). Example 2×2 MIMO equalizers that can be used to implement equalizer 230 are disclosed, e.g., in U.S. Pat. No. 9,020,364 and U.S. Patent Application Publication No. 2015/0372764, both of which are incorporated herein by reference in their entirety.

Digital signals $232_X$ and $232_Y$ generated by equalizer 230 are applied to a carrier-recovery module 240 that is configured to perform signal processing generally directed at (i) compensating the frequency mismatch between the carrier frequencies of OLO signal 158 and input optical signal 130' and/or (ii) reducing the effects of phase noise. Various signal-processing techniques that can be used to implement the frequency-mismatch-compensation processing in carrier-recovery module 240 are disclosed, e.g., in U.S. Pat. Nos. 7,747,177 and 8,073,345, both of which are incorporated herein by reference in their entirety. Example signal-processing techniques that can be used to implement phase-error-correction processing in carrier-recovery module 240 are disclosed, e.g., in U.S. Pat. No. 9,112,614, which is incorporated herein by reference in its entirety.

Digital signals $242_X$ and $242_Y$ generated by carrier-recovery module 250 are applied to a symbol-detection module 250. In an example embodiment, symbol-detection module 250 is configured to use the complex values conveyed by digital signals $242_X$ and $242_Y$ to appropriately map each complex value onto an operative constellation to determine the corresponding received symbol and, based on said mapping, determine the corresponding bit-word encoded by the symbol. Symbol-detection module 250 then concatenates the determined bit-words to generate data streams $252_X$ and $252_Y$.

In some embodiments, data streams $252_X$ and $252_Y$ can be applied to an optional forward-error-correction (FEC) decoder 260 that performs digital signal processing that implements error correction based on data redundancies (if any) in optical signal 130. FEC decoder 260 appropriately multiplexes the resulting error-corrected data streams to generate output data stream 102. Many FEC methods suitable for this purpose are known in the art. Several suitable FEC methods that can be used to implement FEC decoder 260 are disclosed, e.g., in U.S. Pat. Nos. 7,734,191, 7,574,146, 7,424,651, 7,212,741, and 6,683,855, all of which are incorporated herein by reference in their entirety.

Figure 3:
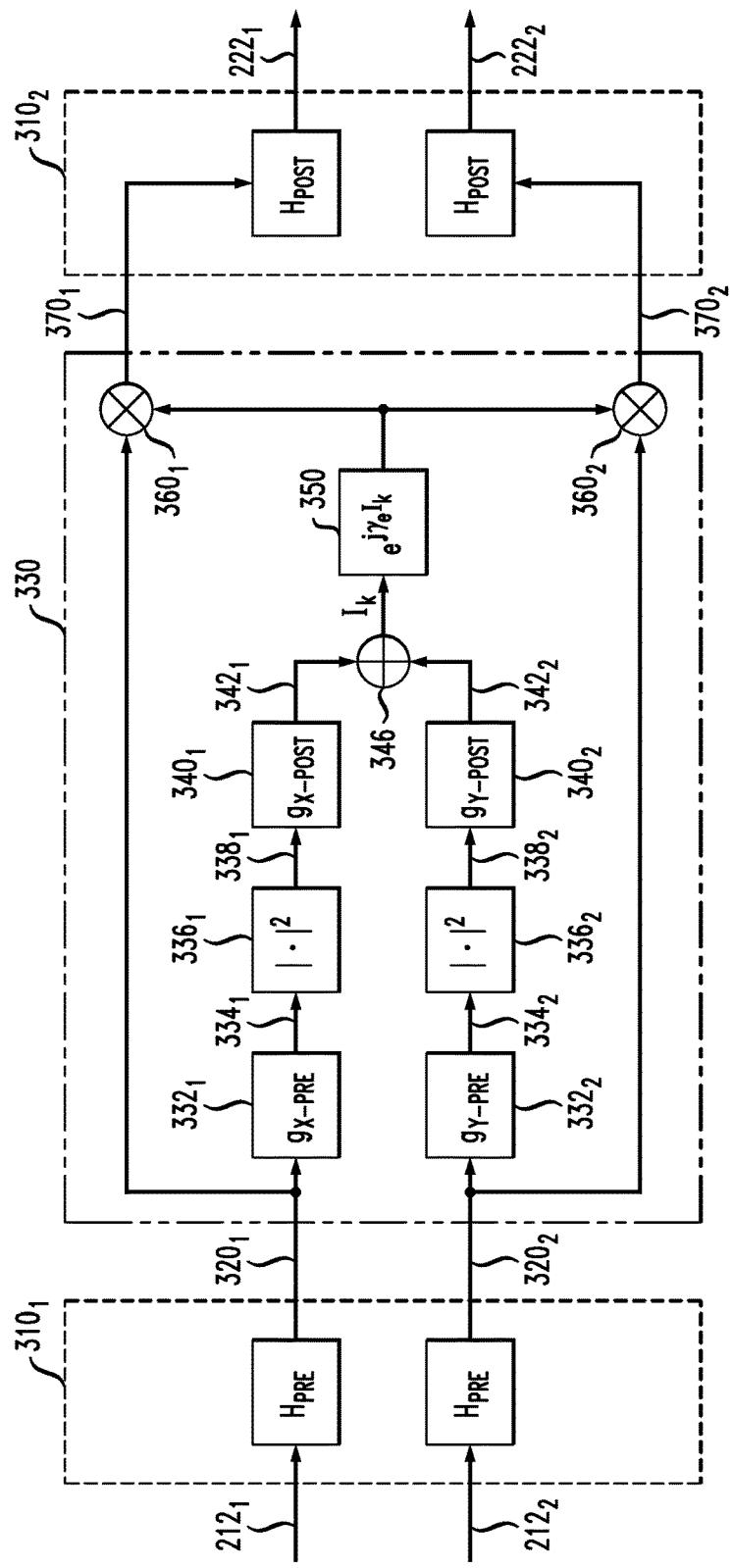
FIG. 3 shows a block diagram of a backward-propagation module that can be used in the digital signal processor of FIG. 2 according to an embodiment.

FIG. 3 shows a block diagram of BP module 220 (FIG. 2) according to an embodiment. Digital signals $212_1$-$212_2$ and $222_1$-$222_2$ are also shown in FIG. 3 to better illustrate the relationship between the circuits shown in FIGS. 2 and 3.

In the shown embodiment, BP module 220 comprises dispersion-compensation modules $310_1$ and $310_2$ and a non-linear-compensation (NLC) module 330. Dispersion-compensation module $310_1$ precedes NLC module 330, and dispersion-compensation module $310_2$ follows the NLC module in the chain of signal processing as indicated in FIG. 3. Each of modules 310 and 330 has two signal-processing paths, each configured to process digital samples corresponding to a different respective polarization component of optical signal 130'.

In operation, dispersion-compensation modules $310_1$ and $310_2$ perform signal processing that tends to reduce the deleterious effects of chromatic dispersion accrued by optical signal 130' in optical transport link 140. For example, the total amount of chromatic dispersion, $CD_t$, compensated by dispersion-compensation modules $310_1$ and $310_2$ can be expressed as follows:

$$CD_t = D_e \times L_0 \qquad (1)$$

where $D_e$ is the effective dispersion coefficient; and $L_0$ is the length of optical fiber used in optical transport link 140. Dispersion-compensation module $310_1$ is configured to compensate a first fraction, e.g., ρ<1, of the total chromatic dispersion $CD_t$; and dispersion-compensation module $310_2$ is configured to similarly compensate a second fraction, e.g., (1−ρ)<1, of the total chromatic dispersion $CD_t$. In some embodiments, the values of both the dispersion coefficient $D_e$ and the fraction ρ can be adjustable parameters of the dispersion-compensation algorithm and can be selected in a manner that optimizes the overall performance of BP module 220, e.g., by minimizing the receiver's BER. In some embodiments, the value of the fraction ρ can be 0.5. In some other embodiments, the value of the fraction ρ can be 0 or 1, in which case one of dispersion-compensation modules $310_1$ and $310_2$ can be omitted.

In various embodiments, dispersion-compensation modules $310_1$ and $310_2$ can be implemented using digital time-domain (e.g., finite impulse response, FIR) filters or digital frequency-domain filters. In an example embodiment, dispersion-compensation modules $310_1$ and $310_2$ can be configured to have the transfer functions $H_{PRE}$ and $H_{POST}$, respectively, approximated by Eqs. (2a)-(2b):

$$H_{PRE}(f) = \exp(-j\rho CD_t \pi (\lambda_0 f)^2 / c) \qquad (2a)$$

$$H_{POST}(f) = \exp(-j(1-\rho) CD_t \pi (\lambda_0 f)^2 / c) \qquad (2b)$$

where $\lambda_0$ is the carrier wavelength; f is the frequency; and c is the speed of light.

Digital signals $320_1$ and $320_2$ generated by dispersion-compensation module $310_1$ are applied to NLC module 330 for being digitally processed therein, e.g., as further described below. The resulting digital signals $370_1$ and $370_2$ generated by NLC module 330 are then applied to dispersion-compensation module $310_2$.

NLC module 330 comprises multipliers $360_1$ and $360_2$ configured to generate digital signals $370_1$ and $370_2$, respectively, by applying a phase rotation to the complex-valued digital samples supplied by digital signals $320_1$ and $320_2$. In an example embodiment, this phase rotation can be implemented in accordance with Eqs. (3a) and (3b):

$$\tilde{x}_k = x_k \exp(j\Phi_k) \quad (3a)$$

$$\tilde{y}_k = y_k \exp(j\Phi_k) \quad (3b)$$

where $\tilde{x}_k$ and $\tilde{y}_k$ are the digital samples carried in the k-th time slot of digital signals $370_1$ and $370_2$, respectively; $x_k$ and $y_k$ are the digital samples carried in the k-th time slot of digital signals $320_1$ and $320_2$, respectively; and $\Phi_k$ is the phase value used for the phase rotation in the k-th time slot.

NLC module 330 further comprises a complex-value generator 350 that operates to compute the exponential factor $\exp(j\Phi_k)$ in each time slot and then apply the computed exponential factor to multipliers $360_1$ and $360_2$ as indicated in FIG. 3. For example, complex-value generator 350 can first compute the value of the phase $\Phi_k$ and then use the computed value of the phase $\Phi_k$ to compute the exponential factor $\exp(j\Phi_k)$, which is then applied to multipliers $360_1$ and $360_2$. The value of the phase $\Phi_k$ can be computed, e.g., in accordance with Eq. (4):

$$\Phi_k = \gamma_e I_k \quad (4)$$

where $\gamma_e$ is the effective nonlinear coefficient representing the nonlinear impairments imposed onto optical signal 130' by optical transport link 140; and $I_k$ is the effective signal intensity (power) in the k-th time slot. In some embodiments, the effective nonlinear coefficient $\gamma_e$ can be an adjustable parameter of the back-propagation algorithm whose value can be selected in a manner that optimizes the overall performance of BP module 220. In some other embodiments, the effective nonlinear coefficient $\gamma_e$ can be a fixed parameter whose value can be obtained using the pertinent technical characteristics of the optical fiber and other optical elements used in optical transport link 140.

NLC module 330 further comprises squaring circuits $336_1$ and $336_2$, digital filters $332_1$, $332_2$, $340_1$, and $340_2$, and an adder 346 that are operatively connected to each other and to other elements of the NLC module as indicated in FIG. 3 to compute the values of $I_k$ applied to complex-value generator 350. Digital filters $332_1$ and $340_1$ are located upstream and downstream, respectively, of squaring circuit $336_1$. Digital filters $332_2$ and $340_2$ are similarly located upstream and downstream, respectively, of squaring circuit $336_2$.

In various embodiments, digital filters $332_1$, $332_2$, $340_1$, and $340_2$ can be implemented using digital time-domain filters or digital frequency-domain filters. A person of ordinary skill in the art will understand that both time-domain and frequency-domain implementations can be designed to have substantially equivalent transfer characteristics. For illustration purposes and without any implied limitations, the subsequent description of digital filters $332_1$, $332_2$, $340_1$, and $340_2$ is given in reference to a time-domain implementation in which each of these digital filters is or comprises an FIR filter.

In an example embodiment, squaring circuits $336_1$ and $336_2$, digital filters $332_1$, $332_2$, $340_1$, and $340_2$, and adder 346 implement the signal processing that causes the effective signal intensity $I_k$ in the k-th time slot to be computed in accordance with Eq. (5):

$$I_k = \sum_{n=0}^{N} g_{X-POST,n} \cdot |P_{x,k-n}|^2 + \sum_{n=0}^{N} g_{Y-POST,n} \cdot |P_{y,k-n}|^2 \quad (5)$$

where (N+1) is the total number of taps in each of the digital filters $340_1$ and $340_2$; n is an index that is used to consecutively number the taps of the digital filter, where $0 \leq n \leq N$; $g_{X-POST}$ is the transfer function of digital filter $340_1$; $g_{Y-POST}$ is the transfer function of digital filter $340_2$; $\{P_{x,k}\}$ is the sequence of digital samples applied by digital filter $332_1$ to squaring circuit $336_1$ by way of a digital signal $334_1$; and $\{P_{y,k}\}$ is the sequence of digital samples applied by digital filter $332_2$ to squaring circuit $336_2$ by way of a digital signal $334_2$.

Digital filters $332_1$ and $332_2$ operate to generate the individual complex-valued digital samples of the sequences $\{P_{x,k}\}$ and $\{P_{y,k}\}$, respectively, in accordance with Eqs. (6a)-(6b):

$$P_{x,k} = \sum_{m=0}^{M} g_{X-PRE,m} \cdot x_{k-m} \quad (6a)$$

$$P_{y,k} = \sum_{m=0}^{M} g_{Y-PRE,m} \cdot y_{k-m} \quad (6b)$$

where (M+1) is the total number of taps in each of the digital filters $332_1$ and $332_2$; m is an index that is used to consecutively number the taps of the digital filter, where $0 \leq m \leq M$; $g_{X-PRE}$ is the transfer function of digital filter $332_1$; $g_{Y-PRE}$ is the transfer function of digital filter $332_2$; and $x_k$ and $y_k$ are the digital samples carried in the k-th time slot of digital signals $320_1$ and $320_2$, respectively (also see Eqs. (3a)-(3b)).

Squaring circuit $336_1$ operates to (i) generate a square of the absolute value of each complex-valued digital sample of the sequence $\{P_{x,k}\}$ received via digital signal $334_1$ from digital filter $332_1$ and (ii) apply the resulting sequence $\{|P_{x,k}|^2\}$ to digital filter $340_1$ by way of a digital signal $338_1$. Squaring circuit $336_2$ similarly operates to (i) generate a square of the absolute value of each complex-valued digital sample of the sequence $\{P_{y,k}\}$ received via digital signal $334_1$ from digital filter $332_1$ and (ii) apply the resulting sequence $\{|P_{x,k}|^2\}$ to digital filter $340_2$ by way of a digital signal $338_2$.

Digital filters $340_1$ and $340_2$ operate to generate digital signals $342_1$ and $342_2$, respectively, and apply these digital signals to adder 346. Digital signal $342_1$ carries the sequence $\{I_{x,k}\}$, the individual digital samples of which are generated by digital filter $340_1$ in accordance with Eq. (7a):

$$I_{x,k} = \sum_{n=0}^{N} g_{X-POST,n} \cdot |P_{x,k-n}|^2 \quad (7a)$$

Digital signal $342_2$ carries the sequence $\{I_{y,k}\}$, the individual digital samples of which are similarly generated by digital filter $340_2$ in accordance with Eq. (7b):

$$I_{y,k} = \sum_{n=0}^{N} g_{Y-POST,n} \cdot |P_{y,k-n}|^2 \quad (7b)$$

Adder 346 operates to sum the digital values conveyed by digital signals $342_1$ and $342_2$ in each time slot, thereby generating the sequence $\{I_k\}$ in accordance with Eq. (8):

$$I_k = I_{x,k} + I_{y,k} \quad (8)$$

The generated sequence $\{I_k\}$ is then applied to complex-value generator 350 as indicated in FIG. 3.

In an example embodiment, digital filters $332_1$, $332_2$, $340_1$, and $340_2$ can be designed and configured such that each of the transfer functions $g_{X-PRE}$, $g_{Y-PRE}$, $g_{X-POST}$, and $g_{Y-POST}$ approximates or is functionally equivalent to a frequency response of a low-pass filter. As known in the pertinent art, a low-pass filter is a filter that passes the signals with a frequency lower than a cutoff frequency and attenuates or blocks the signals with frequencies higher than the cutoff frequency.

In an alternative embodiment, digital filters $332_1$, $332_2$, $340_1$, and $340_2$ can be designed and configured such that each of the transfer functions $g_{X-PRE}$, $g_{Y-PRE}$, $g_{X-POST}$, and $g_{Y-POST}$ approximates or is functionally equivalent to a frequency response of a band-pass filter. As known in the pertinent art, a band-pass filter is a filter that passes frequencies within a certain range and rejects or attenuates frequencies outside that range.

In various embodiments, the frequency envelopes corresponding to the transfer functions $g_{X-PRE}$, $g_{Y-PRE}$, $g_{X-POST}$, and $g_{Y-POST}$ can be selected from a variety of suitable spectral shapes, such as a rectangular shape, a triangular shape, a trapezoid shape, etc. In general, the spectral shapes and the cutoff frequencies of digital filters $332_1$, $332_2$, $340_1$, and $340_2$ can be selected at the design stage in a manner that optimizes the performance characteristics of BP module 220 for the intended application.

Note that BP module 220 employs a single NLC module 330. In this configuration, the resulting BP method in effect uses a relatively coarse size for the backward propagation step. At this size, the effects of CD and nonlinear distortions become convoluted and cannot be cleanly separated in the corresponding mathematical model. This problem is addressed, at least in part, by embodiments of NLC module 330, wherein digital filters $332_1$, $332_2$, $340_1$, and $340_2$ configured to operate, e.g., as described above, help to cancel at least some of the spectral artifacts of the mathematical model, thereby significantly improving the accuracy of the linear and nonlinear compensation. For example, the use of digital filters $332_1$, $332_2$, $340_1$, and $340_2$ in BP module 220 enables the BP module to achieve a better level of performance compared to that achieved when some or all of digital filters $332_1$, $332_2$, $340_1$, and $340_2$ are not present in the corresponding NLC module. Advantageously, a typical level of performance provided by BP module 220 can be obtained at a much lower cost than a comparable level of performance provided by a conventional BP circuit.

Although example embodiments of BP module 220 are described above as being incorporated into receiver DSP 170 (FIG. 1), embodiments of the invention are not so limited. In some embodiments BP module 220 can alternatively be incorporated into transmitter DSP 112 to implement digital signal pre-distortion thereat as known in the pertinent art. For example, general principles of such pre-distortion are reviewed, e.g., in the above-cited paper by Rameez Asif, Chien-Yu Lin, and Bernhard Schmauss, entitled "Digital Backward Propagation: A Technique to Compensate Fiber Dispersion and Non-Linear Impairments."

Figure 4:
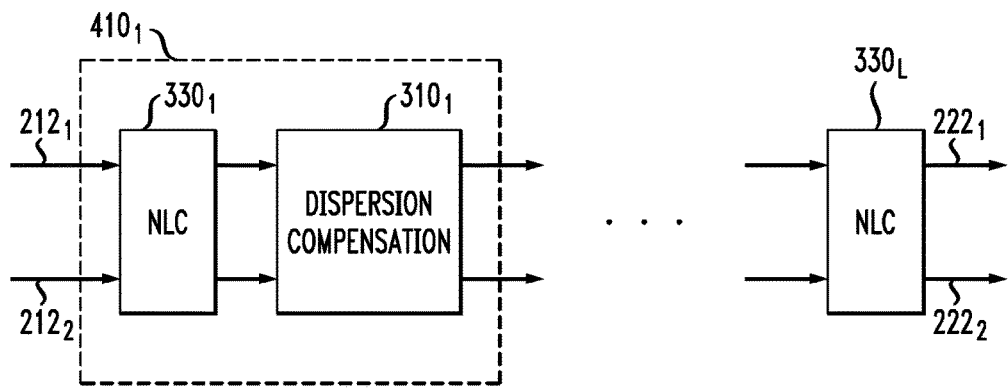
FIG. 4 shows a block diagram of a backward-propagation module that can be used in the digital signal processor of FIG. 2 according to an alternative embodiment.

FIG. 4 shows a block diagram of BP module 220 (FIG. 2) according to an alternative embodiment. In the shown embodiment, BP module 220 comprises: (i) (L−1) serially connected compensation stages 410, where L is an integer greater than one; and (ii) an NLC module $330_L$ connected at the downstream end of the series. Each of the compensation stages $410_i$ includes an NLC module $330_i$ and a dispersion-compensation module $310_i$, where $1 \leq i \leq (L-1)$. Therein, NLC module $330_i$ precedes dispersion-compensation module $310_i$. For illustration purposes and without any implied limitations, only one of the (L−1) compensation stages 410 is explicitly shown in FIG. 4. The minimum number of compensation stages 410 is one, which corresponds to L=2. The possible maximum number of compensation stages 410 is limited by practical considerations, such as the resulting circuit complexity and cost, and can be on the order of ten or greater than ten.

In an example embodiment, compensation stage $410_i$ is configured to carry out BP signal processing corresponding to the i-th section of optical transport link 140, with different compensation stages 410 being configured to perform the BP signal processing corresponding to different respective sections of the optical transport link. NLC module $330_L$ is configured to reduce residual nonlinear distortions that are left uncompensated by the preceding compensation stage(s) 410. Based on the description provided above in reference to FIG. 3 and Eqs. (1)-(8), a person of ordinary skill in the art will understand how to configure NLC modules $330_i$ and dispersion-compensation modules $310_i$ of each compensation stage $410_i$ and further understand how to configure NLC module $330_L$ to cause the corresponding embodiment of BP module 220 to have desired performance characteristics.

Figure 5:
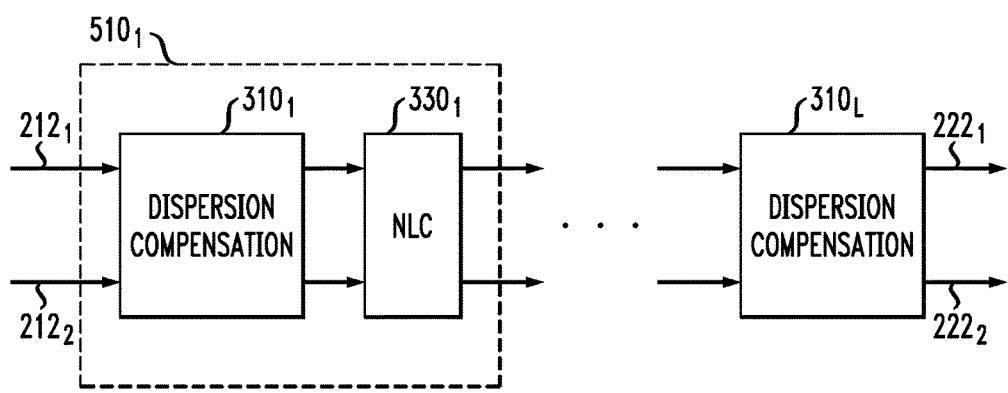
FIG. 5 shows a block diagram of a backward-propagation module that can be used in the digital signal processor of FIG. 2 according to another alternative embodiment.

FIG. 5 shows a block diagram of BP module 220 (FIG. 2) according to another alternative embodiment. In the shown embodiment, BP module 220 comprises: (i) (L−1) serially connected compensation stages 510, where L is an integer greater than one; and (ii) a dispersion-compensation module $310_L$ connected at the downstream end of the series. Each of the compensation stages $510_i$ includes a dispersion-compensation module $310_i$ and an NLC module $330_i$, where $1 \leq i \leq (L-1)$. Therein, NLC module $330_i$ follows dispersion-compensation module $310_i$. For illustration purposes and without any implied limitations, only one of the (L−1) compensation stages 510 is explicitly shown in FIG. 5. The minimum number of compensation stages 510 is one, which corresponds to L=2 (also see FIG. 3). The possible maximum number of compensation stages 510 is limited by practical considerations and can be on the order of ten or greater than ten.

In an example embodiment, compensation stage $510_i$ is configured to carry out BP signal processing corresponding to the i-th section of optical transport link 140, with different compensation stages 510 being configured to perform the BP signal processing corresponding to different respective sections of the optical transport link. Dispersion-compensation module $310_L$ is configured to reduce the residual effects of chromatic dispersion that are left uncompensated by the preceding compensation stage(s) 510. Based on the description provided above in reference to FIG. 3 and Eqs. (1)-(8), a person of ordinary skill in the art will understand how to configure dispersion-compensation modules $310_i$ and NLC modules $330_i$ of each compensation stage $510_i$ and further understand how to configure dispersion-compensation module $310_L$ to cause the corresponding embodiment of BP module 220 to have desired performance characteristics.

Although example embodiments of BP module 220 are described above as being designed and configured for processing polarization-division-multiplexed (PDM) signals, a person of ordinary skill in the art will understand how to modify optical transport system 100 and a disclosed embodiment of BP module 220 to make them suitable for processing communication signals in which both polarizations carry the same sequences of constellation symbols.

Some embodiments can be adapted for use in an optical wavelength-division-multiplexed (WDM) transport system. For example, each WDM channel of such system can be provided with a separate instance (nominal copy) of appropriately configured BP module 220.

In some embodiments, a single pre-filter functionally analogous to digital filter 332 can be used for two or more WDM channels.

Although example embodiments of BP module 220 are described above as employing low-pass and/or band-pass filters 332 and 340, other suitable types of filters can be used in some alternative embodiments.

In some embodiments, BP module 220 can be designed and configured for processing space-division-multiplexed (SDM) signals.

According to an example embodiment disclosed above in reference to FIGS. 1-5, provided is an apparatus (e.g., 100, FIG. 1) comprising: an optical front-end circuit (e.g., 116 or 172, FIG. 1) configured to transmit or receive an optical communication signal (e.g., 130 or 130', FIG. 1); and a signal processor (e.g., 112 or 170, FIG. 1) operatively connected to the optical front-end circuit (e.g., as indicated in FIGS. 1-3) and configured to: apply an electronic phase rotation (e.g., using 330, FIG. 3) to digital samples representing the optical communication signal; and determine a phase value (e.g., $\Phi_k$, Eqs. (3a)-(3b)) for the electronic phase rotation using pre-filtering of the digital samples performed by a low-pass filter (e.g., 332, FIG. 3) prior to applying a squaring operation to the digital samples.

In some embodiments of the above apparatus, the signal processor is further configured to determine the phase value using post-filtering performed by another low-pass filter (e.g., 340, FIG. 3) after the squaring operation.

According to another example embodiment disclosed above in reference to FIGS. 1-5, provided is an apparatus (e.g., 100, FIG. 1) comprising: an optical front-end circuit (e.g., 116 or 172, FIG. 1) configured to transmit or receive an optical communication signal (e.g., 130 or 130', FIG. 1); and a first electronic nonlinear-compensation module (e.g., 330, FIG. 3) operatively connected to the optical front-end circuit (e.g., as indicated in FIGS. 1-3) to process digital samples corresponding to the optical communication signal; and wherein the first electronic nonlinear-compensation module comprises: a first digital filter (e.g., 332$_1$, FIG. 3) configured to digitally filter a first sequence (e.g., $\{x_k\}$, Eq. (3a); 320$_1$, FIG. 3) of the digital samples to generate a second sequence (e.g., $\{P_{x,k}\}$, Eq. (6a); 334$_1$, FIG. 3) of the digital samples; and a first squaring circuit (e.g., 336$_1$, FIG. 3) configured to generate a squared absolute value of each digital sample of the second sequence to generate a third sequence (e.g., $\{|P_{x,k}|^2\}$; 338$_1$, FIG. 3) of the digital samples; and wherein the first electronic nonlinear-compensation module is configured to: apply a phase rotation (e.g., in accordance with Eq. (3a)) to the first sequence of the digital samples; and determine a phase value (e.g., $\Phi_k$, Eqs. (3a)-(3b)) used in the phase rotation using the third sequence of the digital samples.

In some embodiments of the above apparatus, the first digital filter is configured to operate as a low-pass filter or as a band-pass filter.

In some embodiments of any of the above apparatus, the apparatus comprises an optical receiver (e.g., 190, FIG. 1) configured to receive the optical communication signal; and wherein the optical front-end circuit and the first electronic nonlinear-compensation module are parts of the optical receiver.

In some embodiments of the above apparatus, the first electronic nonlinear-compensation module further comprises: a second digital filter (e.g., 332$_2$, FIG. 3) configured to digitally filter a fourth sequence (e.g., $\{y_k\}$, Eq. (3b); 320$_2$, FIG. 3) of the digital samples to generate a fifth sequence (e.g., $\{P_{y,k}\}$, Eq. (6b); 334$_2$, FIG. 3) of the digital samples; and a second squaring circuit (e.g., 336$_2$, FIG. 3) configured to generate a squared absolute value of each digital sample of the fifth sequence to generate a sixth sequence (e.g., $\{|P_{y,k}|^2\}$; 338$_2$, FIG. 3) of the digital samples; and wherein the first electronic nonlinear-compensation module is further configured to determine the phase value used in the phase rotation using the sixth sequence of the digital samples.

In some embodiments of the above apparatus, the first sequence of the digital samples corresponds to a first polarization (e.g., X or h) of the optical communication signal; and wherein the fourth sequence of the digital samples corresponds to a different second polarization (e.g., Y or v) of the optical communication signal.

In some embodiments of the above apparatus, the first electronic nonlinear-compensation module is configured to apply a phase rotation (e.g., in accordance with Eq. (3b)) to the fourth sequence of the digital samples using the phase value.

In some embodiments of the above apparatus, the second digital filter is configured to operate as a low-pass filter or as a band-pass filter.

In some embodiments of the above apparatus, the first electronic nonlinear-compensation module further comprises a second digital filter (e.g., 340$_1$, FIG. 3) configured to digitally filter the third sequence of the digital samples to generate a fourth sequence (e.g., $\{I_{X,k}\}$, Eq. (7a); 342$_1$, FIG. 3) of the digital samples; and wherein the first electronic nonlinear-compensation module is further configured to determine the phase value used in the phase rotation using the fourth sequence of the digital samples.

In some embodiments of the above apparatus, the first digital filter comprises a finite-impulse-response filter.

In some embodiments of the above apparatus, the apparatus further comprises a first electronic dispersion-compensation module (e.g., 310$_1$, FIG. 3) configured to generate the first sequence of the digital samples.

In some embodiments of the above apparatus, the apparatus further comprises a second electronic dispersion-compensation module (e.g., 310$_2$, FIG. 3) configured to receive a sequence (e.g., $\{\tilde{x}_k\}$, Eq. (3a); 370$_1$, FIG. 3) of the digital samples generated by the first electronic nonlinear-compensation module using the phase rotation.

In some embodiments of the above apparatus, the apparatus further comprises a dispersion-compensation module (e.g., 310$_1$, FIG. 4) configured to receive a sequence (e.g., $\{\tilde{x}_k\}$, Eq. (3a); 370$_1$, FIG. 3) of the digital samples generated by the first electronic nonlinear-compensation module using the phase rotation.

In some embodiments of the above apparatus, the apparatus further comprises a second electronic nonlinear-compensation module (e.g., 330$_L$, FIG. 4) serially connected with the first electronic nonlinear-compensation module and the dispersion-compensation module (e.g., as indicated in FIG. 4).

In some embodiments of the above apparatus, the second electronic nonlinear-compensation module is a nominal copy of the first electronic nonlinear-compensation module.

In some embodiments of the above apparatus, the first electronic nonlinear-compensation module is a part of a digital signal processor (e.g., 112 or 170, FIG. 1) configured to implement (e.g., using 220, FIG. 2) a backward-propagation algorithm corresponding to the optical communication signal; and wherein the backward-propagation algorithm uses the phase rotation.

In some embodiments of the above apparatus, the optical front-end circuit is configured to receive the optical communication signal from an optical transport link (e.g., 140, FIG. 1); and wherein the digital signal processor is configured to recover data encoded in the optical communication signal using the backward-propagation algorithm.

In some embodiments of the above apparatus, the optical front-end circuit is configured to apply the optical communication signal to an optical transport link (e.g., 140, FIG. 1) for propagation therethrough; and wherein the backward-propagation algorithm is configured to cause a pre-distortion of the optical communication signal that tends to be removed by the propagation.

While this disclosure includes references to illustrative embodiments, this specification is not intended to be construed in a limiting sense. Various modifications of the described embodiments, as well as other embodiments within the scope of the disclosure, which are apparent to persons skilled in the art to which the disclosure pertains are deemed to lie within the principle and scope of the disclosure, e.g., as expressed in the following claims.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain the nature of this disclosure may be made by those skilled in the art without departing from the scope of the disclosure, e.g., as expressed in the following claims.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

The described embodiments are to be considered in all respects as only illustrative and not restrictive. In particular, the scope of the disclosure is indicated by the appended claims rather than by the description and figures herein. All changes that come within the meaning and range of equivalency of the claims are to be embraced within their scope.

The description and drawings merely illustrate the principles of the disclosure. It will thus be appreciated that those of ordinary skill in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions. Moreover, all statements herein reciting principles, aspects, and embodiments of the disclosure, as well as specific examples thereof, are intended to encompass equivalents thereof.

The functions of the various elements shown in the figures, including any functional blocks labeled as "processors" and/or "controllers," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

What is claimed is:

1. An apparatus comprising:
   an optical front-end circuit configured to transmit or receive an optical communication signal; and
   a signal processor operatively connected to the optical front-end circuit and configured to:
      apply an electronic phase rotation to digital samples representing the optical communication signal; and
      determine a phase value for the electronic phase rotation using pre-filtering of the digital samples performed by a low-pass filter prior to applying a squaring operation to the digital samples.

2. The apparatus of claim 1, wherein the signal processor is further configured to determine the phase value using post-filtering performed by another low-pass filter after the squaring operation.

3. An apparatus comprising:
   an optical front-end circuit configured to transmit or receive an optical communication signal; and a first electronic nonlinear-compensation module operatively connected to the optical front-end circuit to process digital samples corresponding to the optical communication signal; and wherein the first electronic nonlinear-compensation module comprises:
- a first digital filter configured to digitally filter a first sequence of the digital samples to generate a second sequence of the digital samples; and
- a first squaring circuit configured to generate a squared absolute value of each digital sample of the second sequence to generate a third sequence of the digital samples; and wherein the first electronic nonlinear-compensation module is configured to:
- apply a phase rotation to the first sequence of the digital samples;
- determine a phase value used in the phase rotation using the third sequence of the digital samples; and wherein the first digital filter is configured to operate as a low-pass filter or a band-pass filter.

4. The apparatus of claim 3,
wherein the apparatus comprises an optical transmitter configured to generate the optical communication signal; and
wherein the optical front-end circuit and the first electronic nonlinear-compensation module are parts of the optical transmitter.

5. The apparatus of claim 3,
wherein the apparatus comprises an optical receiver configured to receive the optical communication signal; and
wherein the optical front-end circuit and the first electronic nonlinear-compensation module are parts of the optical receiver.

6. The apparatus of claim 3, wherein the first electronic nonlinear-compensation module further comprises:
- a second digital filter configured to digitally filter a fourth sequence of the digital samples to generate a fifth sequence of the digital samples; and
- a second squaring circuit configured to generate a squared absolute value of each digital sample of the fifth sequence to generate a sixth sequence of the digital samples; and wherein the first electronic nonlinear-compensation module is further configured to determine the phase value used in the phase rotation using the sixth sequence of the digital samples.

7. The apparatus of claim 6,
wherein the first sequence of the digital samples corresponds to a first polarization of the optical communication signal; and
wherein the fourth sequence of the digital samples corresponds to a different second polarization of the optical communication signal.

8. The apparatus of claim 6, wherein the first electronic nonlinear-compensation module is configured to apply a phase rotation to the fourth sequence of the digital samples using the phase value.

9. The apparatus of claim 6,
wherein the second digital filter is configured to operate as a low-pass filter or as a band-pass filter.

10. The apparatus of claim 3,
wherein the first electronic nonlinear-compensation module further comprises a second digital filter configured to digitally filter the third sequence of the digital samples to generate a fourth sequence of the digital samples; and
wherein the first electronic nonlinear-compensation module is further configured to determine the phase value used in the phase rotation using the fourth sequence of the digital samples.

11. The apparatus of claim 10,
wherein the second digital filter is configured to operate as a low-pass filter or as a band-pass filter.

12. The apparatus of claim 3, wherein the first digital filter comprises a finite-impulse-response filter.

13. The apparatus of claim 3, further comprising a first electronic dispersion-compensation module configured to generate the first sequence of the digital samples.

14. The apparatus of claim 13, further comprising a second electronic dispersion-compensation module configured to receive a sequence of the digital samples generated by the first electronic nonlinear-compensation module using the phase rotation.

15. The apparatus of claim 3, further comprising a dispersion-compensation module configured to receive a sequence of the digital samples generated by the first electronic nonlinear-compensation module using the phase rotation.

16. The apparatus of claim 15, further comprising a second electronic nonlinear-compensation module serially connected with the first electronic nonlinear-compensation module and the dispersion-compensation module.

17. The apparatus of claim 3,
wherein the first electronic nonlinear-compensation module is a part of a digital signal processor configured to implement a backward-propagation algorithm corresponding to the optical communication signal; and
wherein the backward-propagation algorithm uses the phase rotation.

18. The apparatus of claim 17,
wherein the optical front-end circuit is configured to receive the optical communication signal from an optical transport link; and
wherein the digital signal processor is configured to recover data encoded in the optical communication signal using the backward-propagation algorithm.

19. The apparatus of claim 17,
wherein the optical front-end circuit is configured to apply the optical communication signal to an optical transport link for propagation therethrough; and
wherein the backward-propagation algorithm is configured to cause a pre-distortion of the optical communication signal that tends to be removed by the propagation.

* * * * *